(12) United States Patent
Kondo et al.

(10) Patent No.: US 10,266,053 B2
(45) Date of Patent: Apr. 23, 2019

(54) CONTROLLER FOR DRIVING FORCE TRANSMITTING APPARATUS

(71) Applicant: JTEKT CORPORATION, Osaka-shi (JP)

(72) Inventors: Hirokazu Kondo, Takahama (JP); Tomoaki Kato, Kariya (JP); Go Nagayama, Toyama (JP); Akiyoshi Kakita, Toyota (JP)

(73) Assignee: JTEKT CORPORATION, Osaka-shi (JP)

( * ) Notice: Subject to any disclaimer, the term of this patent is extended or adjusted under 35 U.S.C. 154(b) by 8 days.

(21) Appl. No.: 15/724,426

(22) Filed: Oct. 4, 2017

(65) Prior Publication Data

US 2018/0093565 A1  Apr. 5, 2018

(30) Foreign Application Priority Data

Oct. 4, 2016 (JP) .................. 2016-196324

(51) Int. Cl.
*B60K 23/08* (2006.01)
*B60K 17/35* (2006.01)
(Continued)

(52) U.S. Cl.
CPC .......... *B60K 23/0808* (2013.01); *B60K 17/35* (2013.01); *B60K 28/16* (2013.01);
(Continued)

(58) Field of Classification Search
USPC ........................................ 701/69
See application file for complete search history.

(56) References Cited

U.S. PATENT DOCUMENTS 5,809,445 A * 9/1998 Yamamoto ............. B60K 28/16
180/197
6,845,838 B2 * 1/2005 Wakao .................. F16D 48/06
180/233

(Continued)

FOREIGN PATENT DOCUMENTS

| JP | 11-148395 | 6/1999 |
| JP | 2004-338685 | 12/2004 |
| JP | 2005-7972 | 1/2005 |

OTHER PUBLICATIONS

Extended Search Report dated Jan. 31, 2018 in European Patent Application No. 17194286.5.

*Primary Examiner* — Dirk Wright
(74) *Attorney, Agent, or Firm* — Oblon, McClelland, Maier & Neustadt, L.L.P.

(57) ABSTRACT

A controller for a driving force transmitting apparatus mounted in a four-wheel-drive vehicle, includes: a driving force controller configured to calculate a command torque indicating a driving force to be transmitted to the sub-drive wheels via the driving force transmitting apparatus based on a traveling state of the four-wheel-drive vehicle and a road surface condition, and to control the driving force transmitting apparatus based on the command torque; and a road surface condition determiner configured to determine that the road surface condition is a high-μ condition when a duration of a non-slipping state where a vehicle speed is equal to or higher than a prescribed value and a slip ratio of each of both the main drive wheels is lower than a prescribed value has become equal to or longer than a prescribed time.

2 Claims, 4 Drawing Sheets

(51) Int. Cl.

| | | |
|---|---|---|
| *B60K 28/16* | (2006.01) | |
| *B60W 10/20* | (2006.01) | |
| *B60W 30/02* | (2012.01) | |
| *B60W 30/18* | (2012.01) | |
| *B60W 40/068* | (2012.01) | |

(52) U.S. Cl.
   CPC ............ *B60W 10/20* (2013.01); *B60W 30/02* (2013.01); *B60W 30/18172* (2013.01); *B60W 40/068* (2013.01); *B60W 2300/18* (2013.01); *B60W 2422/50* (2013.01); *B60W 2510/20* (2013.01); *B60W 2520/26* (2013.01); *B60W 2520/266* (2013.01); *B60W 2520/28* (2013.01); *B60W 2520/403* (2013.01); *B60W 2530/20* (2013.01); *B60W 2540/10* (2013.01); *B60W 2540/18* (2013.01); *B60W 2550/12* (2013.01); *B60W 2710/027* (2013.01); *B60W 2720/403* (2013.01); *F16D 2500/10431* (2013.01)

(56) References Cited

U.S. PATENT DOCUMENTS

| | | | | |
|---|---|---|---|---|
| 8,620,546 | B2 * | 12/2013 | Kobayashi | ........... B60K 17/348 |
| | | | | 180/248 |
| 8,700,280 | B2 * | 4/2014 | Nozu | ..................... B60K 17/35 |
| | | | | 701/69 |
| 9,389,616 | B2 * | 7/2016 | Murakami | ......... B60K 23/0808 |
| 2005/0004741 | A1 | 1/2005 | Shigeta et al. | |
| 2010/0094519 | A1 * | 4/2010 | Quehenberger | ....... B60K 17/35 |
| | | | | 701/69 |

\* cited by examiner

CONTROLLER FOR DRIVING FORCE TRANSMITTING APPARATUS

INCORPORAITON BY REFERNECE

The disclosure of Japanese Patent Application No. 2016-196324 filed on Oct. 4, 2016 including the specification, drawings and abstract, is incorporated herein by reference in its entirety.

BACKGROUND OF THE INVENTION

1. Field of the Invention

The invention relates to a controller for a driving force transmitting apparatus mounted in a four-wheel-drive vehicle.

2. Description of the Related Art

A four-wheel-drive vehicle includes a pair of right and left main drive wheels to which a driving force generated by a drive source is always transmitted while the four-wheel-drive vehicle is traveling and a pair of right and left sub-drive wheels to which a driving force generated by the drive source is transmitted so as to be adjustable based on a traveling state. Conventionally, such a four-wheel drive vehicle includes a driving force transmitting apparatus configured to transmit the driving force to the sub-drive wheels and a controller configured to control the driving force transmitting apparatus. Such a controller may have a function of determining whether a road surface is in a low-µ (low friction) condition or a high-µ (high friction) condition, and may be configured to control the driving force transmitting apparatus based on the determination result. See, for example, Japanese Unexamined Patent Application Publication No. 2004-338685 (JP 2004-338685 A).

A controller (driving force distribution controller) described in JP 2004-338685 A calculates an amount of low-µ information associated with a coefficient of road surface friction based on a slip ratio of a wheel and an amount of acceleration operation. When the amount of low-µ information is larger than an addition-determination threshold value, the controller adds the amount of low-µ information to a count value. On the other hand, when the amount of low-µ information is equal to or smaller than the addition-determination threshold value, the controller subtracts a constant from the count value. When the count value is larger than a low-µ road determination threshold value, the controller determines that the road surface is in the low-µ condition.

The controller described in JP 2004-338685 A calculates the amount of low-µ information associated with the coefficient of road surface friction based on the slip ratio of the wheel and the amount of acceleration operation. Thus, when the amount of acceleration operation is small, for example, when the vehicle is in a steady traveling state where the vehicle is travelling straight forward on a flat road surface at a constant speed, the controller may fail to accurately determine a road surface condition.

SUMMARY OF THE INVENTION

One object of the invention is to provide a controller for a driving force transmitting apparatus, the controller configured to appropriately determine a road surface condition even when a four-wheel-drive vehicle is in a steady traveling state.

An aspect of the invention relates to a controller for a driving force transmitting apparatus mounted in a four-wheel drive vehicle including a pair of right and left main drive wheels to which a driving force generated by a drive source is always transmitted while the four-wheel-drive vehicle is traveling and a pair of right and left sub-drive wheels to which a driving force generated by the drive source is adjustably transmitted via the driving force transmitting apparatus. The controller includes: a driving force controller configured to calculate a command torque indicating a driving force to be transmitted to the right and left sub-drive wheels via the driving force transmitting apparatus based on a traveling state of the four-wheel-drive vehicle and a road surface condition, and configured to control the driving force transmitting apparatus based on the command torque; and a road surface condition determiner configured to determine that the road surface condition is a high-µ condition when a duration of a non-slipping state where a vehicle speed is equal to or higher than a prescribed value and a slip ratio of each of both the right and left main drive wheels is lower than a prescribed value has become equal to or longer than a prescribed time.

With the controller for the driving force transmitting apparatus according to the above aspect, it is possible to appropriately determine a road surface condition even when the four-wheel-drive vehicle is in a steady traveling state.

BRIEF DESCRIPTION OF THE DRAWINGS

The foregoing and further features and advantages of the invention will become apparent from the following description of example embodiments with reference to the accompanying drawing, wherein like numerals are used to represent like elements and wherein.

DETAILED DESCRIPTION OF EMBODIMENTS

Figure 1:
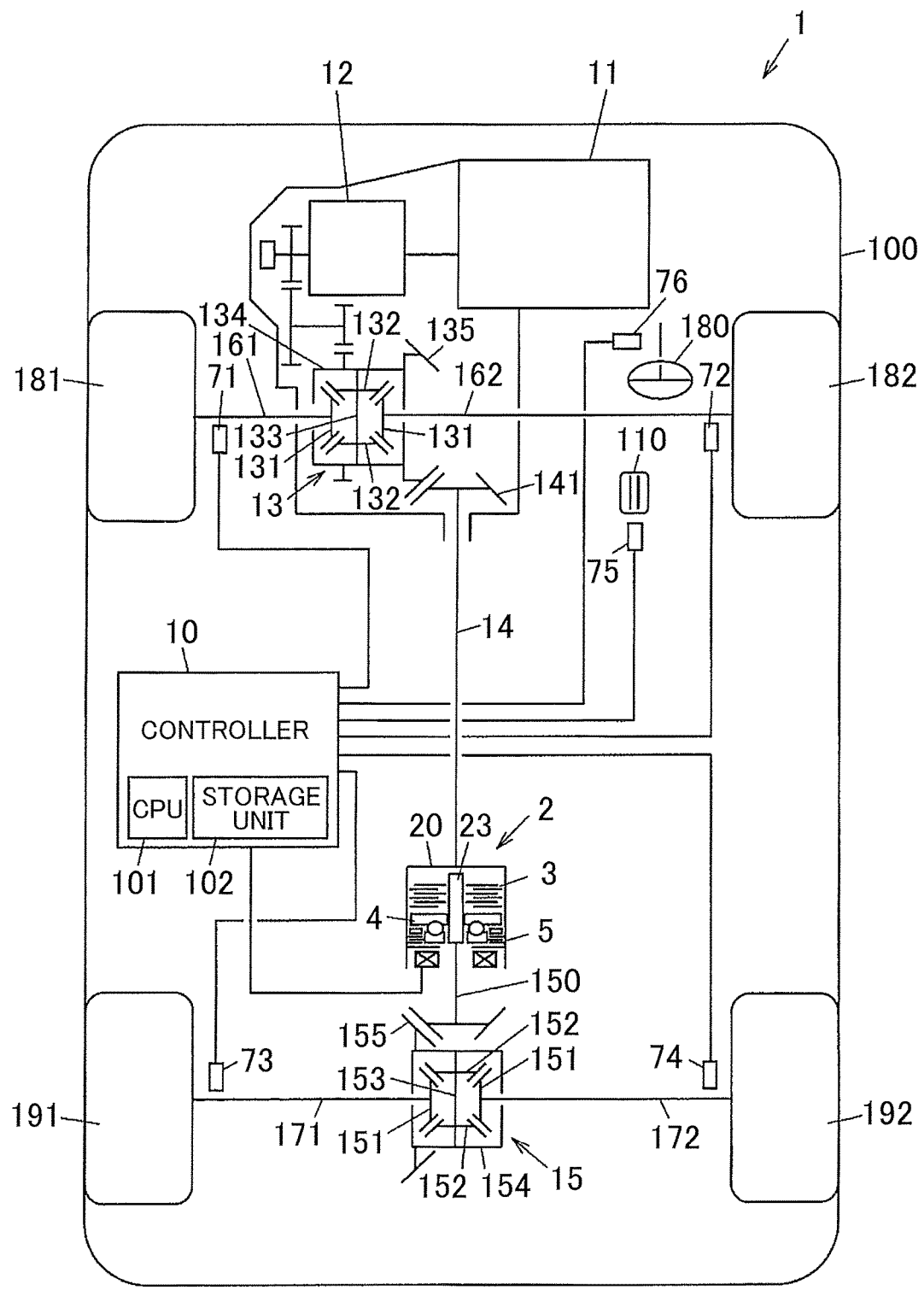
FIG. 1 is a schematic configuration diagram illustrating an example of the schematic configuration of a four-wheel-drive vehicle including a driving force transmitting apparatus according to an embodiment of the invention.

Hereinafter, example embodiments of the invention will be described with reference to FIG. 1 to FIG. 4. FIG. 1 is a schematic configuration diagram illustrating an example of the schematic configuration of a four-wheel-drive vehicle including a driving force transmitting apparatus according to an embodiment of the invention.

As illustrated in FIG. 1, a four-wheel-drive vehicle 1 includes: a vehicle body 100; an engine 11 serving as a drive source configured to generate torque for allowing the vehicle to travel; a transmission 12 configured to change the speed of rotation output from the engine 11; a steering wheel 180; right and left front wheels 182, 181 serving as main drive wheels to which a driving force generated by the engine 11 is always transmitted via the transmission 12 that performs speed change; and right and left rear wheels 192, 191 serving as sub-drive wheels to which a driving force generated by the engine 11 is transmitted based on, for example, a traveling state of the four-wheel-drive vehicle 1. The four-wheel-drive vehicle 1 can be switched between a four-wheel-drive state where a driving force generated by the engine 11 is transmitted to the right and left front wheels 182, 181 and the right and left rear wheels 192, 191, and a two-wheel-drive state where a driving force generated by the engineer 11 is transmitted only to the right and left front wheels 182, 181. The right and left front wheels 182, 181 serve also as steered wheels that are steered through a steering operation of the steering wheel 180.

The four-wheel-drive vehicle 1 further includes a front differential 13, a propeller shaft 14, a rear differential 15, front-wheel-side right and left drive shafts 162, 161, rear-wheel-side right and left drive shafts 171, 171, a driving force transmitting apparatus 2 disposed between the propeller shaft 14 and the rear differential 15, and a controller 10 configured to control the driving force transmitting apparatus 2. The controller 10 functions also as a road surface condition determiner configured to determine whether the condition of a road surface on which the four-wheel-drive vehicle 1 is traveling is a high-µ (high-friction) condition or the condition of the road surface is a low-µ (low-friction) condition.

A driving force generated b the engine 11 is transmitted to the right and left front wheels 182, 181 via the transmission 12, the front differential 13, and the front-wheel-side right and left drive shafts 162, 161. The front differential 13 includes: a pair of side gears 131 that are respectively coupled to the front-wheel-side right and left drive shafts 162, 161 so as to be non-rotatable relative to the front-wheel-side right and left drive shafts 162, 161, a pair of pinion gears 132 meshed with the side gears 131 such that the gear axis of the pinion gears 132 is perpendicular to the gear axis of the side gears 131, a pinion gear shaft 133 supporting the pinion gears 132, and a front differential case 134 in which these components are housed.

A ring gear 135 is fixed to the font differential case 134. The ring gear 135 is in mesh with a pinion gear 141 that is provided at a front end portion of the propeller shaft 14 in the vehicle front-rear direction. A rear end portion of the propeller shaft 14 in the vehicle front-rear direction is coupled to a housing 20 of the driving force transmitting apparatus 2. The driving force transmitting apparatus 2 includes an inner shaft 23 disposed so as to be rotatable relative to the housing 20. The driving force transmitting apparatus 2 transmits a driving force corresponding to an excitation current supplied from the controller 10, to the rear differential 15 via a pinion gear shaft 150 that is coupled to the inner shaft 23 so as to be non-rotatable relative to the inner shaft 23. the driving force transmitting apparatus 2 will be described in detail later.

The rear differential 15 includes: a pair of side gears 151 that are respectively coupled to the rear-wheel-side right and left drive shafts 1721, 171 so as to be non-rotatable relative to the rear-wheel-side right and left drive shafts 171, 171; a pair of pinion gears 152 meshed with the side gears 151 such that the gear axis of the pinion gears 152 is perpendicular to the gear axis of the side gears 151; a pinion gear shaft 153 supporting the pinion gears 152; a rear differential case 154 in which these components are housed; and a ring gear 155 fixed to the rear differential case 154 and meshed with the pinion gear shaft 50.

The controller 10 can detect a traveling state of the four-wheel-drive vehicle 1, based on output signals from rotation speed sensors 72, 71, 74, 73 that respectively detect rotation speeds of the right and left front wheels 182, 181 and the right and left rear wheels 192, 191, an accelerator pedal sensor 75 that detects an amount of depression of an accelerator pedal 110, and a steering angle sensor 76 that detects a turning angle (steering angle) of the steering wheel 180. Each of the rotation speed sensors 71 to 74 is, for example, a magnetic sensor that detects a magnetic pole of a pulser ring fixed to a hub ring of a hub unit that rotates together with a corresponding one of the wheels in an integrated manner. The controller 10 can detect a rotation speed of each wheel by counting the number of times that the magnetic pole changes within a prescribed time, based on an output signal from a corresponding one of the rotation speed sensors 71 to 74. The controller 10 controls the driving force transmitting apparatus 2 based on the traveling state of the four-wheel-drive vehicle 1 and the road surface condition to be described later.

More specifically, the controller 10 controls the driving force transmitting apparatus 2 such that a larger driving force is transmitted to the right and left rear wheels 192, 191 as the difference between an average rotation speed of the right and left front wheels 182, 181 and an average rotation speed of the right and left rear wheels 192, 191 is larger or as the amount of depression of the accelerator pedal 110 is larger. When the road surface condition is the low-µ condition, in order to enhance the traveling stability, the controller 10 controls the driving force transmitting apparatus 2 such that the four-wheel-drive vehicle 1 is placed in a four-wheel-drive state in which the ratio of a driving force distributed to the right and left rear wheels 192, 191 with respect to the driving force distributed to the front and rear wheels 181, 181, 192, 191 is higher than that when the road surface condition is the high-µ condition.

The driving force transmitting apparatus 2 transmits a driving force corresponding to an excitation current supplied form the controller 10, from the propeller shaft 14 toward the rear differential 15. By increasing or reducing the excitation current through, for example, PWM control, the controller 10 can adjust the driving force transmitted to the right and left rear wheels 192, 191 via the driving force transmitting apparatus 2.

Figure 2:
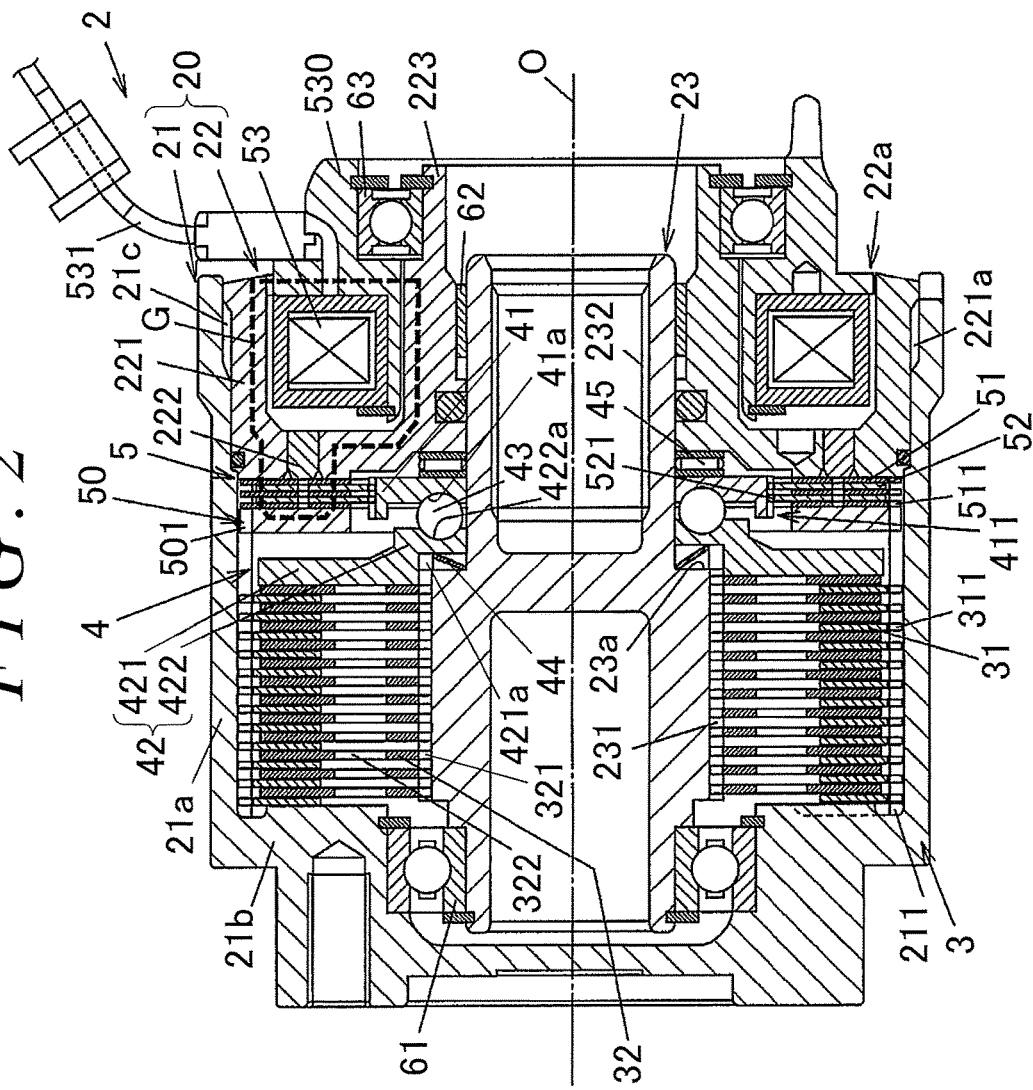
FIG. 2 is a sectional view illustrating an example of the configuration of the driving force transmitting apparatus.

FIG. 2 is a sectional view illustrating an example of the configuration of the driving force transmitting apparatus 2. In FIG. 2, the upper side with respect to a rotation axis O illustrates an actuated sate (torque transmitted state) of the driving force transmitting apparatus 2, whereas the lower side with respect to the rotation axis O illustrates an unactuated state (torque non-transmitted state) of the driving force transmitting apparatus 2. Hereinafter, a direction parallel to the rotation axis O will be referred to as an axial direction.

The driving force transmitting apparatus 2 includes: the housing 20 serving as an outer rotary member including a front housing 21 and a rear housing 22; the inner shaft 23 having a tubular shape and serving as an inner rotary member that is supported coaxially with the housing 20 so as to be rotatable relative to the housing 20; a main clutch 3 configured to transmit a driving force between the housing 20 and the inner shaft 23; a cam mechanism 4 configured to generate a pressing force for pressing the main clutch 3; and an electromagnetic clutch mechanism 5 configured to actuate the cam mechanism 4 upon reception of a rotary force of the front housing 21. Lubricating oil (not illustrated) is sealed in an internal space of the housing 20. The cam mechanism 4 is an example of a pressing mechanism configured to apply a pressing force to the main clutch 3.

The front housing 21 includes a cylindrical portion 21a and a bottom portion 21b that are integral with each other. Thus, the front housing 21 has a bottomed cylindrical shape. An internal thread 21c is provided on an inner surface of an open end portion of the cylindrical portion 21a. The front housing 21 is made of a non-magnetic metal material, such as aluminum. The propeller shaft 14 (see FIG. 1) is coupled to the bottom portion 21b via, for example, a cross joint.

An inner peripheral surface of the cylindrical portion 21a of the front housing 21 is provided with a plurality of outer peripheral spline projections 211 extending in the axial direction. The outer peripheral spline projections 211 project radially inward toward the rotation axis O (illustrated in FIG. 22) of the housing 20 and the inner shaft 23.

The rear housing 22 includes: a first annular member 221 made of a magnetic martial, such as iron; a second annular member 222 that is made of a non-magnetic material, such as austenitic stainless steel, and that is integrated with an inner peripheral portion of the first annular member 221 by, for example, welding; and a third annular member 223 that is made of a magnetic material, such as iron, and that is integrated with an inner peripheral portion of the second annular member 222 by, for example, welding. A housing space 22a having an annular shape and housing therein a solenoid coil 53 is provided between the first annular member 221 and the third annular member 223. An outer peripheral surface of the first annular member 221 is provided with an external thread 221a that is screwed to the internal thread 21c of the front housing 21.

The inner shaft 23 is supported on an inner peripheral side of the housing 20 by a ball bearing 61 and a needle roller bearing 62. An outer peripheral surface of the inner shaft 23 is provided with a plurality of inner peripheral spline projections 231 extending in the axial direction. An inner surface of one end portion of the inner shaft 23 is provided with a spline fitting portion 232 to which one end portion of the pinion gear shaft 150 (see FIG. 1) is fitted so as to be non-rotatable relative to the inner shaft 23.

The main clutch 3 is a friction clutch including a plurality of main outer clutch plates 31 and a plurality of main inner clutch plates 32. The main outer clutch plates 31 and the main inner clutch plates 32 are disposed alternately in the axial direction. Friction sliding between the main outer clutch plates 31 and the main inner clutch plates 32 is smoothed by lubricating oil (not illustrated) sealed between the housing 20 and the inner shaft 23, so that wear and seizure of these plates are suppressed.

Each main outer clutch plate 31 has, at its outer peripheral end, a plurality of engagement projections 311 that are engaged with the outer peripheral spline projections 211 of the front housing 21. When the engagement projections 311 of each main outer clutch plate 31 are engaged with the outer peripheral spline projections 211, the main outer clutch plate 31 is prevented from rotating relative to the front housing 21 while being allowed to move in the axial direction relative to the front housing 21.

Each main inner clutch plate 32 has, at its inner peripheral end, a plurality of engagement projections 321 that are engaged with the inner peripheral spline projections 231 of the inner shaft 23 with backlashes left between the engagement projections 321 and the inner peripheral spline projections 231 in the circumferential direction. Each main inner clutch plate 32 has a plurality of oil holes 322 through which the lubricating oil flows. The oil holes 322 are provided at positions radially inward of the main outer clutch plates 31. When the engagement projections 321 of each main inner clutch plate 32 are engaged with the inner peripheral spline projections 231, the main inner clutch plate 32 is prevented from rotating relative to the inner shaft 23 while being allowed to move in the axial direction relative to the inner shaft 23.

The cam mechanism 4 includes: a pilot cam 41 that receives a rotary force of the housing 21 via the electromagnetic clutch mechanism 5; a main cam 42 serving as a pressing member that presses the main clutch 3 in the axial direction; and a plurality of cam balls 43 having a spherical shape and disposed between the pilot cam 41 and the main cam 42.

The main cam 42 includes: a pressing portion 421 having an annular shape and configured to press the main clutch 3 by coming into contact with the main inner clutch plate 32 disposed at one end of the main clutch 3; and a cam portion 422 provided radially inward of the pressing portion 421 in the main cam 42. The pressing portion 421 and the cam portion 422 are integral with each other. When a spline engaging portion 421a provided at an inner peripheral end of the pressing portion 421 is engaged with the inner peripheral spline projections 231 of the inner shaft 23, the main cam 42 is prevented from rotating relative to the inner shaft 23. The main cam 42 is urged to as to be separated from the main clutch 3 in the axial direction by a disc spring 44 disposed between the main cam 42 and a step surface 23a provided in the inner shaft 23.

The pilot cam 41A has, at its outer peripheral end, a spline engaging portion 411 that receives, from the electromagnetic clutch mechanism 4, a rotary force for rotating the pilot cam 41 relative to the main cam 42. A thrust needle roller bearing 45 is disposed between the pilot cam 41 and the third annular member 223 of the rear housing 22.

The pilot cam 41 has a plurality of cam grooves 41a provided in a surface thereof facing the cam portion 422 of the main cam 42. The cam portion 422 of the main cam 42 has a plurality of cam grooves 422a provided in a surface thereof facing the pilot cam 41. The depth of each cam groove 41a in the axial direction and the depth of each cam groove 422a in the axial direction vary in the circumferential direction. The cam balls 43 are disposed between the cam grooves 41a of the pilot cam 41 and the cam grooves 422a of the main cam 42. When the pilot cam 41 rotates relative to the main cam 42, the cam mechanism 4 generates an axial pressing force for pressing the main clutch 3. When the main clutch 3 receives the pressing force form the cam mechanism 4, the main outer clutch plates 31 and the main inner clutch plates 32 of the main clutch 3 come into friction contact with each other, and a driving force is transmitted due to the frictional force.

The electromagnetic clutch mechanism 5 includes an armature 50, a plurality of pilot outer clutch plates 51, a plurality of pilot inner clutch plates 52, and the solenoid coil 53.

The solenoid coil 53 is held by a yoke 530 having an annular shape and made of a magnetic material, and is housed in the housing space 22a of the rear housing 22. The yoke 530 is supported by the third annular member 223 of the rear housing 22 via a ball bearing 63. The yoke 530 has an outer peripheral surface facing an inner peripheral surface of the first annular member 221. The yoke 530 has an inner peripheral surface facing an outer peripheral surface of the third annular member 223. An excitation current is supplied from the controller 10 through an electric wire 531 to the solenoid coil 53.

The pilot outer clutch plates 51 and the pilot inner clutch plates 52 are disposed alternately in the axial direction between the armature 50 and the rear housing 22. In a radially center portion of each of the pilot outer clutch plates 51 and the pilot inner clutch plates 52, a plurality of arc-shaped slits is proved in order to prevent short-circuit of a magnetic flux that is generated upon energization of the solenoid coil 53.

Each pilot outer clutch plate 51 has, at its outer peripheral end, a plurality of engagement projections 511 that are engaged with the outer peripheral spline projections 211 of the front housing 21. Each pilot inner clutch plate 52 has, at its inner peripheral end, a plurality of engagement projections 521 that are engaged with the spline engaging portion 411 of the pilot cam 41.

The armature 50 is an annular member made of a magnetic material, such as iron. The armature 50 has, at outer peripheral portion, a plurality of engagement projections 501 that are engaged with the outer peripheral spline projections 211 of the front housing 21. Thus, the armature 50 is allowed to move in the axial direction relative to the front housing 21 while being prevented from rotting relative to the front housing 21.

In the driving force transmitting apparatus 2 configured as described above, the armature 50 is attracted toward the rear housing 22 by a magnetic force generated when an excitation current is supplied to the solenoid coil 53, so that the pilot outer clutch plates 51 and the pilot inner clutch plates 52 come into friction contact with each other. Thus, a rotary force of the housing 20 is transmitted to the pilot cam 41, the pilot cam 41 rotates relative to the main cam 42, and then the cam balls 43 roll in the cam grooves 41a, 422a. When the cam balls 43 roll, a cam thrust force for pressing the main clutch 3 is generated in the main cam 42, and thus a frictional force is generated between the main outer clutch plates 31 and the main inner clutch plates 32. Due to the frictional force, torque is transmitted between the housing 20 and the inner shaft 213. The torque transmitted by the main clutch 3 is increased or decreased based on the excitation current supplied to the solenoid coil 53.

The controller 10 includes a central processing unit (CPU) 101 that is an arithmetic processor, and a storage unit 102 including semiconductor memory elements, such as a read-only memory (ROM) and a random-access memory (RAM). The CPU 101 executes programs stored in the storage unit 102.

Figure 3:
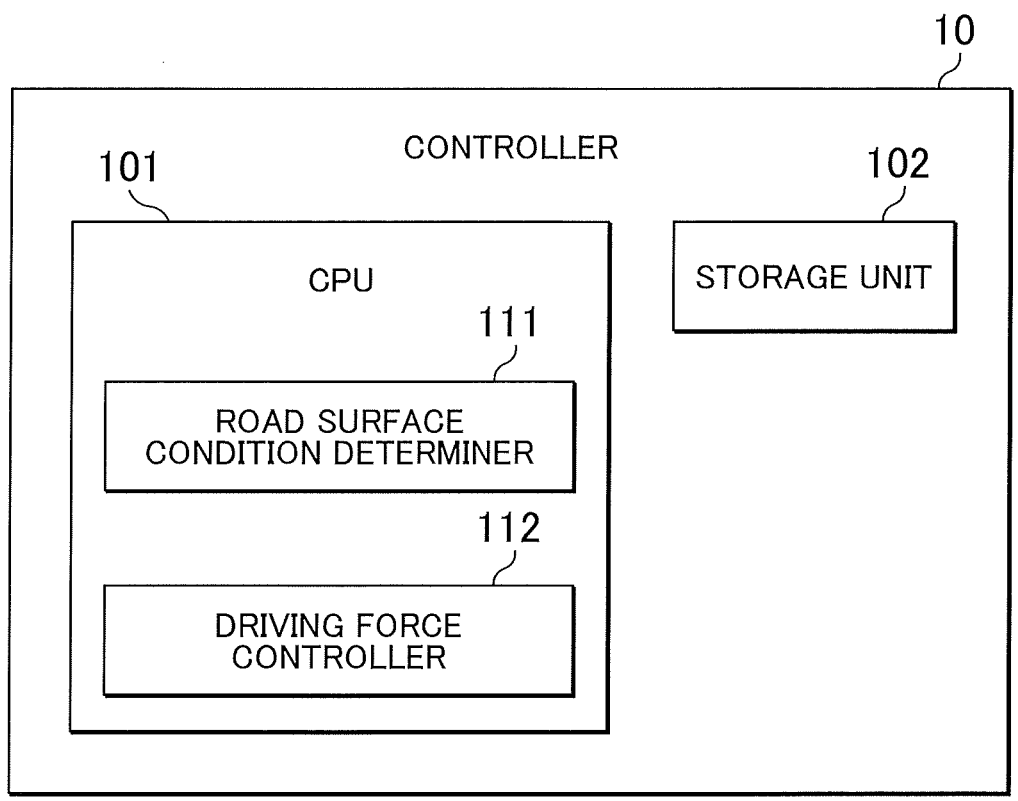
FIG. 3 is a function block diagram illustrating the functional configuration of a controller.

FIG. 3 is a function block diagram illustrating the functional configuration of the controller 10. The CPU 101 functions as a road surface condition determiner 111 and a driving force controller 112 by executing the programs stored in the storage unit 102. The road surface condition determiner 111 determines whether the road surface condition is the high-μ condition or the road surface condition is the low-μ condition. Examples of the high-μ condition include a dry road condition, and examples of the low-μ condition include a compacted snow road condition and a frozen road condition. The driving force controller 112 calculates a command torque to be transmitted to the right and left rear wheels 192, 191 via the driving force transmitting apparatus 2, based on the traveling state of the four-wheel-drive vehicle 1 and the condition of the road surface on which the four-wheel-drive vehicle 1 is traveling, and the driving force controller 122 controls the driving force transmitting apparatus 2 based on the command torque. Specifically, the driving force controller 112 supplies an excitation current corresponding to the command torque to the solenoid coil 53 of the driving force transmitting apparatus 2.

In the present embodiment, the road surface condition determiner 111 determines that the road surface condition is the high-μ condition, when an outside temperature is equal to or higher than a prescribed temperature, when a tire reaction force is equal to or larger than a prescribed value, or when a duration of a non-slipping state where the vehicle speed is equal to or higher than a prescribed threshold value and the slip ratio of each of both the right and left front wheels 182, 181 is lower than a prescribed threshold value has become equal to or longer than a prescribed time.

Hereinafter, the process executed by the road surface condition determiner 111 will be described in detail with reference to FIG. 4.

Figure 4:
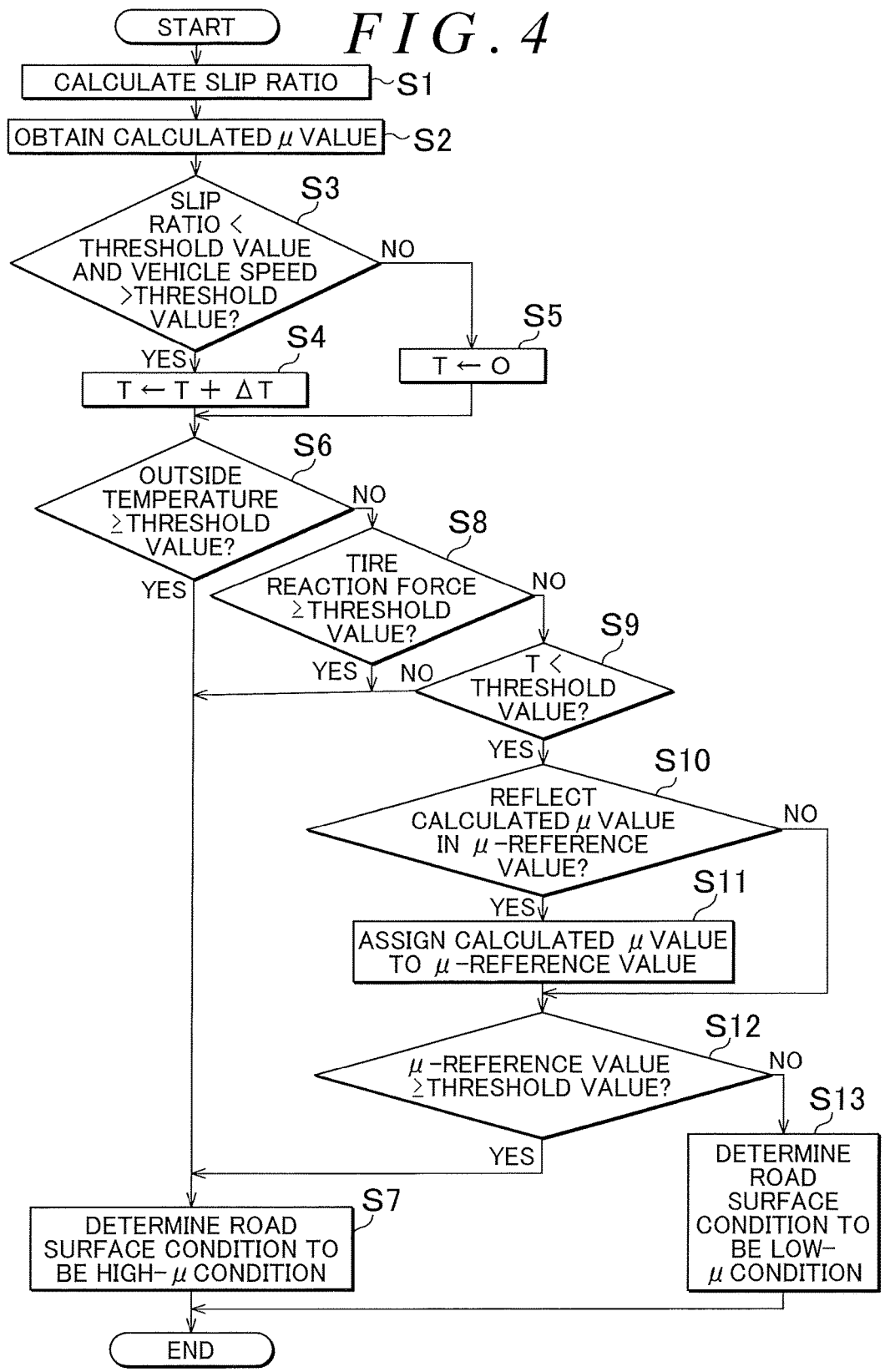
FIG. 4 is a flowchart illustrating an example of the procedure of a process executed by the controller.

FIG. 4 is a flow-chart illustrating an example of the procedure of the process executed by the CPU 101 of the controller 10 serving as the road surface condition determiner 111. As the road surface condition determiner 111, the CPU 101 executes the process illustrated in this flowchart repeatedly in prescribed control cycles (e.g., cycles of 5 ms).

In one control cycle, first, the road surface condition determiner 111 calculates the slip ratio of each of the right and left front wheels 182, 181 (step S1). In the present embodiment, as indicated by Expression (1) below, a slip ratio $\delta 1$ of the left front wheel 181 is calculated based on a vehicle body speed v, a wheel speed $\omega 1$ of the left front wheel 181, and a turning correction term $\Phi$ that is determined based on a steering angle $\phi$. As indicated by Expression (2) below, a slip ratio $\delta 2$ of the right front wheel 182 is calculated based on the vehicle body speed v, a wheel speed $\omega 2$ of the right front wheel 182, and the turning correction term $\Phi$.

$$\delta 1 = \left(1 - \frac{v}{\omega 1}\right) - \Phi \quad (1)$$

$$\delta 2 = \left(1 - \frac{v}{\omega 2}\right) - \Phi \quad (2)$$

Here, the vehicle body speed v is a traveling speed of the vehicle body 100 on the assumption that none of the right and left front wheels 182, 181 and the right and left rear wheels 192, 191 is slipping, and the vehicle body sped v can be obtained, for example, based on a rotation speed of a wheel rotating at the lowest rotation speed among the right and left front wheels 182, 181 and the right and left rear wheels 192, 191. The wheel speed $\omega 1$ is a vehicle speed that is obtained based on the rotation speed and the wheel diameter of the left front wheel 181 on the assumption that none of the wheels is slipping. The turning correction term $\Phi$ is used to correct the influence of a difference in the rotation speed between the front and rear wheels and between the right and left wheels due to turning of the vehicle.

The slip ratio $\delta 1$ of the left front wheel 181 is one (1), for example, when the left front wheel 181 is spinning (wheel speed $\omega 1 > 0$) while the four-wheel-drive vehicle 1 is at a standstill (vehicle body speed v=0) in a state where the steering angle $\phi$ is zero (turning correction term $\Phi$=0). On the other hand, the slip ratio $\delta 1$ of the left front wheel 181 is zero (0), for example, when the left front wheel 181 is not slipping. the same applies to the slip ratio $\delta 2$ of the right front wheel 182.

Next, the road surface condition determiner 111 obtains a calculated μ value (step S2). Here, the calculated μ value is a calculated value that is proportional to a driving force distributed to the right and left front wheels 182, 181 out of the torque (total driving force) resulting from a speed change of the rotation output from an output shaft (crankshaft) of the engine 11, which is performed by the transmission 12. A coefficient of road surface friction is estimated to be higher than at least the calculated μ value, when the four-wheel-drive vehicle 1 is traveling straight forward at a substantially constant speed and none of the right and left front wheels 182, 181 and the right and left rear wheels 192, 191 is slipping (this state will be referred to as a "steady traveling state"). In the present embodiment, the calculated μ value is obtained by Expression (3) below.

$$\text{Calculated } \mu \text{ value} = \frac{\text{Total driving force} - \text{Command torque}}{\mu\text{-calculation coefficient}} \quad (3)$$

where $$\mu\text{-calculation coefficient} = \frac{\text{Front wheel axial load} \times \text{Gravitational acceleration} \times \text{Tire radius}}{\text{Propeller shaft gear ratio}}$$

Here, the numerator of Expression (3) is a value obtained by subtracting form the total driving force, the driving force distributed to the right and left rear wheels 192, 191 via the driving force transmitting apparatus 2, and therefore corresponds to the driving force distributed to the right and left front wheels 192, 191 that are main drive wheels. The front wheel axial load is an axial load acting on the right and left front wheels 182, 181, and the tire radius is the radius of each of the tires of the right and left front wheels 182, 181. The propeller shaft gear ratio is a gear ratio between the ring gear 125 and the pinion gear 141 that rotates together with the propeller shaft 14 in an integrated manner.

Next, the road surface condition determiner 111 determines whether each of both the slip ratios (the slip ratio δ1 and the slip ratio δ2) calculated in step S1 is lower than a threshold value, and whether the vehicle speed is higher than a threshold value (step S3). When teach of both the slip ratios is lower than the threshold value and the vehicle speed is higher than the threshold value (step S3: Yes), the road surface condition determiner 111 adds a prescribed value ΔT to a timer value T (step S4). The prescribed value ΔT is a value corresponding to the control cycle (e.g., 5 ms) described above. On the other hand, when one of the slip ratios is equal to or higher than the threshold value (one of the slip ratio δ1 and the slip ratio δ2 is equal to or higher than the threshold value) or when the vehicle speed is equal to or lower than the threshold value (step S3: No), the road surface condition determiner 111 sets the timer value T to zero (step S5).

Next, the road surface condition determiner 111 determines whether the outside temperature is equal to or higher than a prescribed threshold value (step S6). As the outside temperature information, a measurement result obtained by an outside temperature indicator or an engine intake air temperature indicator can be acquired, for example, through an in-vehicle communication network, such as a controller area network (CAN). The threshold value used in step S6 is a temperature at which the road surface may be frozen (e.g., 0° C.).

When the outside temperature is determined to be lower than the threshold value in step S6 (step S6: No), the road surface condition determiner 111 determines whether the tire-reaction force is equal to or larger than a prescribed threshold value (step S8). The tire reaction force is an external force applied from the road surface to the tires of the right and left front wheels 182, 181. The tire reaction force can be detected, for example, by a tire reaction force sensor provided in a steering apparatus that steers the right and left front wheels 182, 181. The tire reaction force takes a value close to zero when the vehicle is in the steady traveling state or when the coefficient of road surface friction is considerably low, for example, due to a frozen road surface. The threshold value used in step S8 is set to a value of a tire reaction force that is not generated in, for example, a compacted snow road or a frozen road.

When the tire reaction force is smaller than the prescribed threshold value (step S8: No), the road surface condition determiner 111 determines whether the timer value T is smaller than a prescribed threshold value (step S9). The threshold value is 60 seconds, for example.

When the outside temperature is equal to or higher than the prescribed threshold value (step S6: Yes), when the tire reaction force is equal to or larger than the prescribed threshold value (step S8: Yes), or when the timer value T is equal to or larger than the prescribed threshold value (step S9: No), the road surface condition determiner 111 determines that the road surface condition is the high-μ condition (step S7), and ends the process. This means that, even when the outside temperature is lower than the prescribed threshold value (step S6: No) and the tire reaction force is smaller than the prescribed threshold value (step S8: No), the road surface condition determiner 111 determines that the road surface condition is the high-μ condition when the duration of the non-slipping state where the vehicle speed is equal to or higher than the prescribed threshold value and the slip ratio of each of both the right and left front wheels 182, 181 is lower than the prescribed threshold value has become equal to or longer than the prescribed time.

When the timer value T is smaller than the prescribed threshold value (step S9: Yes), the road surface condition determiner 111 determines whether to reflect the calculated μ value obtained in step S2 in a μ-reference value that is used in a determination process in step S12 to be described later (step S10). In the present embodiment, when the four-wheel-drive vehicle 1 is in the steady traveling state, the road surface condition determiner 111 determines that the calculated μ value is to be reflected in the μ-reference value. The fact that the four-wheel-drive vehicle 1 is in the steady traveling state can be detected based on detection results obtained by the rotation speed sensors 71 to 74 and the steering angle sensor 76. When the rod surface condition determiner 111 determines in step S10 that the calculated μ value is to be reflected in the μ-reference value (step S10: Yes), the road surface condition determiner 111 assigns the calculated μ value obtained in step S2 to the μ-reference value (step S11).

Next, the road surface condition determiner 111 determines whether the μ-reference value is equal to or larger than a prescribed threshold value (step S12). When it is determined that the μ-reference value is equal to or larger than the threefold value (step S12: Yes), the road surface condition determiner 111 determines that the road surface condition is the high μ-condition (step S7). On the other hand, when the μ-reference value is smaller than the threshold value (step S12: No), the road surface condition determiner 111 determines that the road surface condition is the low-μ condition (step S13). When the road surface condition determiner 111 determines that the calculated μ value is not to be reflected in the μ-reference value (step S10: No), the calculated μ value is not assigned to the μ-reference value, and therefore the determination process in step S12 is executed based on a μ-reference value in a preceding control cycle.

According to the foregoing embodiment of the invention, the road surface condition is determined to be the high-μ condition when the duration of the non-slipping state where the vehicle speed is equal to or higher than the prescribed threshold value (the threshold value of the vehicle speed in step S3) and the slip ratio of each of both the right and left front wheels 182, 181 is lower than the prescribed threshold value (the threshold value of the slip ratio in step S3) has become equal to or longer than the prescribed time (the threshold value in step S9). Thus, even when the four-wheel-drive vehicle 1 is in the steady traveling state, the road surface condition is determined to be the high-μ condition when the non-slipping state has continued for the prescribed time or longer. In this way, the road surface condition can be appropriately determined even when the vehicle is in the steady traveling state.

Moreover, when the outside temperature is equal to or higher than the prescribed temperature or when the tire reaction force applied to the right and left front wheels 182, 181 is equal to or larger than the prescribed value, the road surface condition determiner 111 determines that the road surface condition is the high-μ condition regardless of the duration of the non-slipping state. Thus, the road surface condition can be quickly determined when the outside temperature is equal to or higher than the prescribed temperature or when the tire reaction force is equal to or larger than the prescribed value.

The foregoing embodiment of the invention may be modified as appropriate within the scope of the invention. For example, in the foregoing embodiment, the result of determination regarding the rod surface condition made by the road surface condition determiner 111 is used in the control that is executed by the driving force controller 122 to control the driving force transmitting apparatus 2. However, the invention is not limited to this example. Alternatively, the result of determination regarding the road surface condition made by the road surface condition determiner 111 may be output to a controller that controls an in-vehicle apparatus (e.g., the transmission 12) other than the driving force transmitting apparatus 2. Moreover, the configuration of the driving force transmission system of the four-wheel-drive vehicle 1 is not limited to the example illustrated in FIG. 1, and the invention is applicable to four-wheel-drive vehicle with various configurations as long as a driving force transmitted to sub-drive wheels can be adjusted by a driving force transmitting apparatus.

What is claimed is:

1. A controller for a driving force transmitting apparatus mounted in a four-wheel-drive vehicle including a pair of right and left main drive wheels to which a driving force generated by a drive source is always transmitted while the four-wheel-drive vehicle is traveling and a pair of right and left sub-drive wheels to which a driving force generated by the drive source is adjustably transmitted via the driving force transmitting apparatus, the controller comprising:

a driving force controller configured to calculate a command torque indicating a driving force to be transmitted to the right and left sub-drive wheels via the driving force transmitting apparatus based on a traveling state of the four-wheel-drive vehicle and a road surface condition, and configured to control the driving force transmitting apparatus based on the command torque; and a road surface condition determiner configured to determine that the road surface condition is a high-μ condition when a duration of a non-slipping state where a vehicle speed is equal to or higher than a prescribed value and a slip ratio of each of both the right and left main drive wheels is lower than a prescribed value has become equal to or longer than a prescribed time.

2. The controller for the driving force transmitting apparatus according to claim 1, wherein, when an outside temperature is equal to or higher than prescribed temperature or when a tire reaction force applied to a pair of right and left steered wheels is equal to or larger than a prescribed value, the road surface condition determiner determines that the road surface condition is the high-μ condition regardless of the duration of the non-slipping state.

* * * * *